Figure 1:

(No Model.)

H. T. SMITH.
PEN OR PENCIL HOLDER AND ART OF MAKING THE SAME.

No. 481,534. Patented Aug. 23, 1892.

WITNESSES
J. Martin Tilley
H. A. Hall.

INVENTOR
H. T. Smith
by
Might, Brown & Crossley
His Solicitors

UNITED STATES PATENT OFFICE.

HENRY T. SMITH, OF PAWTUCKET, RHODE ISLAND.

PEN OR PENCIL HOLDER AND ART OF MAKING THE SAME.

SPECIFICATION forming part of Letters Patent No. 481,534, dated August 23, 1892.

Application filed May 10, 1892. Serial No. 432,510. (No model.)

*To all whom it may concern:*

Be it known that I, HENRY T. SMITH, of Pawtucket, in the county of Providence and State of Rhode Island, have invented certain new and useful Improvements in Pen or Pencil Holders and the Art of Making the Same, of which the following is a specification.

This invention, having reference to pen or pencil holders and similar articles and the process of making the same, has for its object the provision of improvements whereby the articles mentioned can be produced much more expeditiously and economically than heretofore, and result in a product of greatly enhanced durability and one possessed of other important advantages over those produced by the methods employed prior to my invention. In the manufacture of hollow tapered metallic pen or pencil holders by previously-practiced modes the said articles were made in two parts—the stock proper, which receives the pen and forms a handle for the thumb and fingers in the manipulation of the device, and the stem or shank. The first-mentioned part was usually made of the same diameter throughout and the latter was tapered from its base to its tip or upper end. One end of the stock part was placed in a press or between dies and pressed or molded, so as to provide it with a bowl suitable for receiving and holding a pen, and a tapering mandrel was placed in the tube of material for the formation of the stem and it was subjected to about twenty-four operations in the graduated holes of a draw-plate to reduce it to proper form and size. This process, besides in itself occupying much time, necessitated frequent stoppages by the workman in order to anneal the stock, which was rendered hard and brittle by the operations which it was undergoing. Again, the work when finished so far as the draw-plate went had an uneven rough surface, requiring fine filing or other treatment to make it sufficiently smooth, so that it was not feasible to use plated stock in the manufacture of the articles. The stock and stem constructed as described were united by solder, rendering the joint weak, and the stock of which the article was made soft and liable to be broken when the holder was subjected to considerable strain, hard usage, or accident.

By my improvements the difficulties and objections mentioned are overcome, the said improvements consisting in taking a single piece of tubing of proper length and forming a bowl in the stock or handle end for holding the pen and then subjecting the stem or shank portion to the action of hammering or swaging dies of proper form and length and so reducing said portion to the desired size and tapering and extending it as desired. By this mode of procedure I am enabled to produce a pen or pencil holder out of a single piece of stock without seam or joint in a small fraction of the time consumed by the old method.

Reference is to be had to the annexed drawings and the letters marked thereon, forming a part of this specification, of which—

Figure 2:
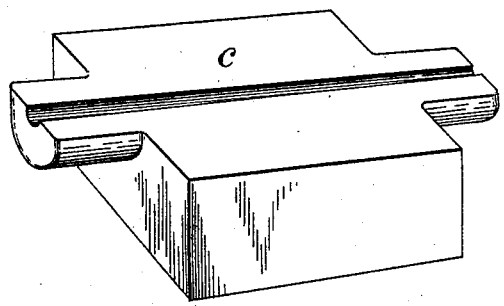
Figure 3:
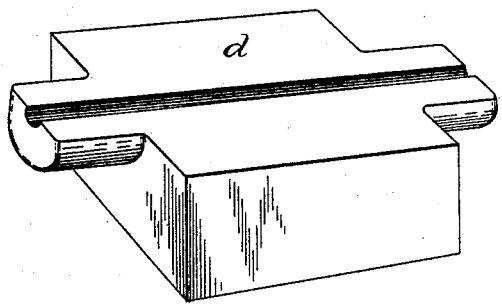
Figure 3:

Figure 1 is a side view of a tube or piece of stock out of which my improved pen or pencil holder may be formed. Fig. 2 represents perspective views of dies which may be employed in the carrying out of my process to form the improved pen or pencil holder. Fig. 3 is a perspective view of a penholder embodying my improvements.

In carrying out my invention I take a piece of tubing $a$, preferably seamless, and by means of dies or in any other suitable way form in the end intended to serve as the stock and holder proper a bowl $b$, adapted to serve as a holder for the pen. I then introduce the opposite end and portion designed to form the stem or shank of the device between dies $c\ d$ of a swaging or rotary hammering machine and reduce said portion to tapering form, as indicated between the points $e\ f$ of Fig. 3, after which I may leave plain, chase, or ornament, or finish the stock part $g$ and other portions, if desired, in any way that taste or necessity may suggest. In this way I am enabled to form a pen or pencil holder of hollow stock of one piece without seam or joint or solder and without the use of a mandrel or other means than that for producing the bowl $b$ and the dies $c\ d$ for extending and tapering the stem or shank. I am also enabled to form the article out of plated stock, since when it comes from the dies it is perfectly smooth and finished and needs not to be filed or otherwise treated.

No annealing of the material being operated upon is necessary during the process, which is performed with such expedition that two workmen may make from two to three penholders a minute from stock of the form represented in Fig. 1.

A very important feature of the invention resides in the fact that the article produced is formed from a single piece without joint at the point *e*, the junction of the stock and stem.

I claim—

1. A tubular metallic pen or pencil holder having a tapered stem or shank and consisting of a single jointless piece of stock, as described.

2. The art of forming pen or pencil holders, consisting in taking a piece of tubular stock, forming the bowl *b* in one end thereof, and subjecting the opposite end and stem portion to tapered hammering-dies, as set forth.

In testimony whereof I have signed my name to this specification, in the presence of two subscribing witnesses, this 27th day of April, A. D. 1892.

HENRY T. SMITH.

Witnesses:
CLAUDE J. FARNSWORTH,
CHARLES D. WOOD.